(12) United States Patent
Das et al.

(10) Patent No.: US 7,573,942 B2
(45) Date of Patent: Aug. 11, 2009

(54) METHOD FOR ENCODING AND DECODING CONTROL INFORMATION IN A WIRELESS COMMUNICATIONS SYSTEM

(75) Inventors: Arnab Das, Old Bridge, NJ (US); Farooq Ullah Khan, Manalapan, NJ (US); Ashwin Sampath, Somerset, NJ (US); Hsuan-Jung Su, Ocean, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1660 days.

(21) Appl. No.: 09/991,111

(22) Filed: Nov. 16, 2001

(65) Prior Publication Data

US 2003/0095605 A1 May 22, 2003

(51) Int. Cl.
*H04L 27/00* (2006.01)
(52) U.S. Cl. ...................... 375/259; 375/335
(58) Field of Classification Search ................ 375/259; 370/335, 342, 441, 470, 479
See application file for complete search history.

(56) References Cited

U.S. PATENT DOCUMENTS

| | | | | |
|---|---|---|---|---|
| 5,182,753 A | | 1/1993 | Dahlin et al. ................ 371/43 |
| 5,309,474 A | * | 5/1994 | Gilhousen et al. ........... 370/209 |
| 5,734,645 A | | 3/1998 | Raith et al. ................. 370/329 |
| 5,907,586 A | * | 5/1999 | Katsuragawa et al. ....... 375/341 |
| 6,311,306 B1 | * | 10/2001 | White et al. ................ 714/790 |
| 6,438,119 B1 | * | 8/2002 | Kim et al. ................... 370/335 |
| 6,526,030 B2 | * | 2/2003 | Rezaiifar et al. ............ 370/335 |
| 6,553,540 B1 | * | 4/2003 | Schramm et al. ............ 714/790 |
| 6,567,475 B1 | * | 5/2003 | Dent et al. .................. 375/286 |
| 6,621,873 B1 | * | 9/2003 | Kim et al. ................... 375/295 |
| 6,678,263 B1 | * | 1/2004 | Hammons et al. ........... 370/342 |
| 2002/0044595 A1 | * | 4/2002 | Friedrich .................... 375/219 |
| 2002/0071407 A1 | * | 6/2002 | Koo et al. ................... 370/335 |
| 2003/0039230 A1 | * | 2/2003 | Ostman et al. .............. 370/335 |
| 2003/0125040 A1 | * | 7/2003 | Walton et al. ............... 455/454 |
| 2004/0133841 A1 | * | 7/2004 | Lundby et al. .............. 714/790 |
| 2006/0176866 A1 | * | 8/2006 | Wakabayashi .............. 370/342 |

FOREIGN PATENT DOCUMENTS

DE 19842039 A1 4/2000
EP 1067730 A1 * 1/2001

OTHER PUBLICATIONS

2000, Automatic Repeat Request (ARQ) and Hybrid ARQ (HA),□□http://www.cs.berkeley.edu/~adj/cs294-1.s98/projects/FECDelay/tsld008.htm.*
May 31, 1999, Properties of Optimized Punctring Scheme, http://www.3gpp.org/ftp/tsg_ran/WG1_RL1/TSGR1_05/Docs/Pdf/r1-99641.pdf.*

* cited by examiner

*Primary Examiner*—Chieh M. Fan
*Assistant Examiner*—Freshteh N Aghdam

(57) ABSTRACT

A method for processing control information in a wireless communications system is described in which portions of the control information are separately encoded and decoded such that transmission format information for a corresponding data transmission can be determined with a reduced set of decoded control information. The control information is convolutionally coded using either a single set of tail bits or by judiciously dispersing the tail bits among different portions of the encoded signaling information.

13 Claims, 5 Drawing Sheets

US 7,573,942 B2

METHOD FOR ENCODING AND DECODING CONTROL INFORMATION IN A WIRELESS COMMUNICATIONS SYSTEM

TECHNICAL FIELD

The invention relates generally to wireless communication systems and, more particularly, to methods for encoding and decoding information that is transmitted in control channels in such systems.

BACKGROUND OF THE INVENTION

In wireless communication systems, an air interface is used for the exchange of information between a mobile station and a base station or other communication system equipment. The air interface typically comprises a plurality of communication channels. In the well-known High Speed Downlink Packet Access (HSDPA) specification in the Universal Mobile Telecommunication System (UMTS) standard, for example, a High Speed Downlink Shared Channel (HS-DSCH) is used for transmissions from a base station to a plurality of mobile stations (e.g., user equipment).

To facilitate data transmission via the High Speed Downlink Shared Channel (HS-DSCH), signaling information is provided via dedicated and shared control channels. More specifically, a separate, dedicated Downlink Physical Channel (DPCH) is assigned to each mobile station and is used, in one exemplary function, for indicating when a respective mobile station has a transmission during a particular transmission time interval. In addition to the dedicated control channels, there are also a plurality of Shared Control Channels (SCCHs) that are associated with the High Speed Downlink Shared Channel (HS-DSCH). The Shared Control Channels (SCCHs) are used for transmitting signaling information that is needed for the mobile station to process the corresponding data transmission. By way of example, signaling information in the Shared Control Channels (SCCHs) can include transmission format information such as code information (which codes are used for the data transmission), modulation information, Transport Block Set Size (TBSS), and so on. The Shared Control Channels (SCCHs) are used on a shared basis among all the mobile stations such that a mobile station would read a Shared Control Channel (SCCH) only upon an indication (e.g., via its dedicated DPCH) that the Shared Control Channel (SCCH) is intended for that particular mobile station.

As is well known, control or signaling information that is transmitted via a Shared Control Channel (SCCH) is typically encoded, e.g., with block codes or convolutional codes. As such, a mobile station must decode all the information in the Shared Control Channel (SCCH), which is then used for processing the corresponding data transmission. Prior methods for decoding signaling information in the Shared Control Channel (SCCH) are limited in several respects. For example, there are inherent limitations in block coding (e.g., coding inefficiency) as well as convolutional coding (e.g., additional overhead because of tail bits). Moreover, decoding all of the signaling information corresponding to a data transmission can lead to increased complexity as a result of timing requirements (e.g., offsets and delays between signaling and data transmission), buffering requirements, detection and correction of errors in the decoding of signaling information, and so on.

SUMMARY OF THE INVENTION

An efficient and reliable method of processing control information with minimum added overhead in a wireless communication system is realized according to the principles of the invention by separately encoding/decoding portions of the control information and by deriving transmission format information for the corresponding data transmission from selected portions of the decoded control information. Efficiency over the prior methods is realized because the entire coded sequence of control information is not needed to derive transmission format information for the corresponding data transmission. Reliability is achieved by using convolutional codes with the judicious placement of tail bits to minimize additional overhead requirements.

According to one illustrative embodiment, control information is processed in a wireless communication system via a control channel that includes encoded signaling information for a corresponding data transmission in another channel. In the control channel, only a portion of the encoded signaling information is separately decoded in order to determine a transmission format for the corresponding data transmission. The portion of encoded signaling information is decoded before the remainder of the encoded signaling information is decoded. In one exemplary embodiment, the signaling information is convolutionally coded using a single set of tail bits. In another illustrative embodiment, tail bits are added to different portions of the encoded signaling information to further improve the reliability in the decoding of the signaling information.

BRIEF DESCRIPTION OF THE DRAWING

A more complete understanding of the present invention may be obtained from consideration of the following detailed description of the invention in conjunction with the drawing, with like elements referenced with like reference numerals, in which.

DETAILED DESCRIPTION

Although the principles of the invention are particularly well-suited for wireless communications systems based on the well-known High Speed Downlink Packet Access (HSDPA) specification in the Universal Mobile Telecommunication System (UMTS) standard, and will be described in this exemplary context, it should be noted that the embodiments shown and described herein are meant to be illustrative only and not limiting in any way. As such, various modifications will be apparent to those skilled in the art for application to other transmission systems and are contemplated by the teachings herein.

Before addressing the illustrative embodiments of the invention, the channel structure and signaling operation of a typical wireless communication system according to the HSDPA standard will be described to provide a context for understanding the principles of the invention.

Figure 1:
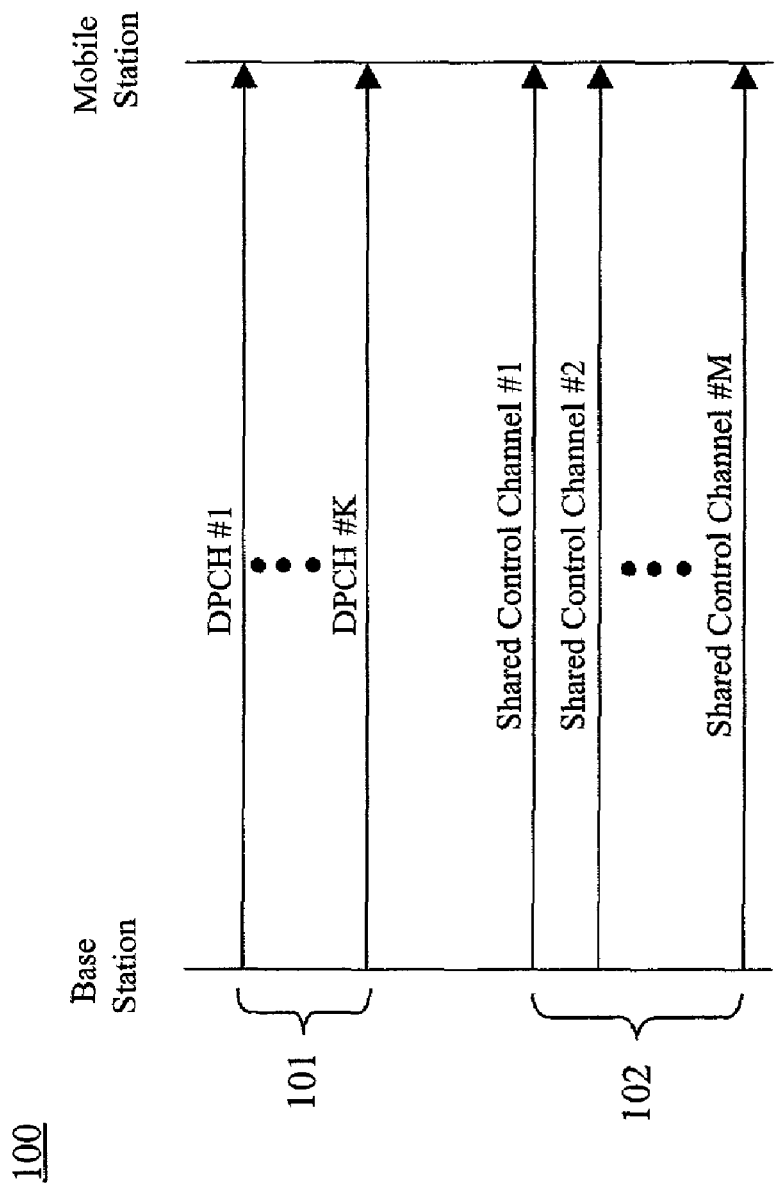
FIG. 1 shows a simplified diagram of signaling channels associated with a high speed downlink shared channel in a wireless communication system.

In the HSDPA standard, a High Speed Downlink Shared Channel (HS-DSCH) is used for transmissions from a base station to a plurality of mobile stations (e.g., user equipment). Signaling information corresponding to a data transmission in a HS-DSCH is transported via dedicated Downlink Physical Channels (DPCHS) as well as via Shared Control Channels (SCCHs). For example, FIG. 1 shows a basic physical channel structure 100 for downlink signaling corresponding to the High Speed Downlink Shared Channel (HS-DSCH) from the perspective of a mobile station. In particular, each mobile station (user) has a dedicated Downlink Physical Channel (DPCH) 101, e.g., a separate DPCH for each of users 1 through K in this example. Multiple, code-multiplexed Shared Control Channels (SCCHs) 102, e.g., 1 through M in this example, are also used on a shared basis among all the users for signaling information. In the current version of the HSDPA standard, the number of Shared Control Channels (SCCHs) can range from a minimum of one (M=1) to a maximum of four (M=4) and each Shared Control Channel (SCCH) corresponds to a separate user (e.g., mobile station). In the example where M=4, each of the K Downlink Physical Channels (DPCHs) and four (4) Shared Control Channels (SCCHs) for a subset of the K users would therefore be transmitted in each frame (e.g., transmission time interval (TTI) in HSDPA). Future versions of the HSDPA specification may not be limited in this manner, e.g., more than four Shared Control Channels (SCCHs) may be used, multiple Shared Control Channels (SCCHs) for a particular user, and so on.

In a typical transmission scenario according to the current HSDPA specification, a HS-DSCH Indicator (HI) is transmitted in a particular user's dedicated Downlink Physical Channel (DPCH) to indicate to that user that one of the Shared Control Channels (SCCHs) in that same Transmission Time Interval (TTI) needs to be read by that user. Accordingly, the HS-DSCH Indicator (HI) is sent either in parallel or prior to the Shared Control Channel (SCCH) that is to be read by the user. If a HS-DSCH Indicator (HI) is not present in a particular user's dedicated Downlink Physical Channel (DPCH), then that user does not have to decode a Shared Control Channel (SCCH).

Figure 2:
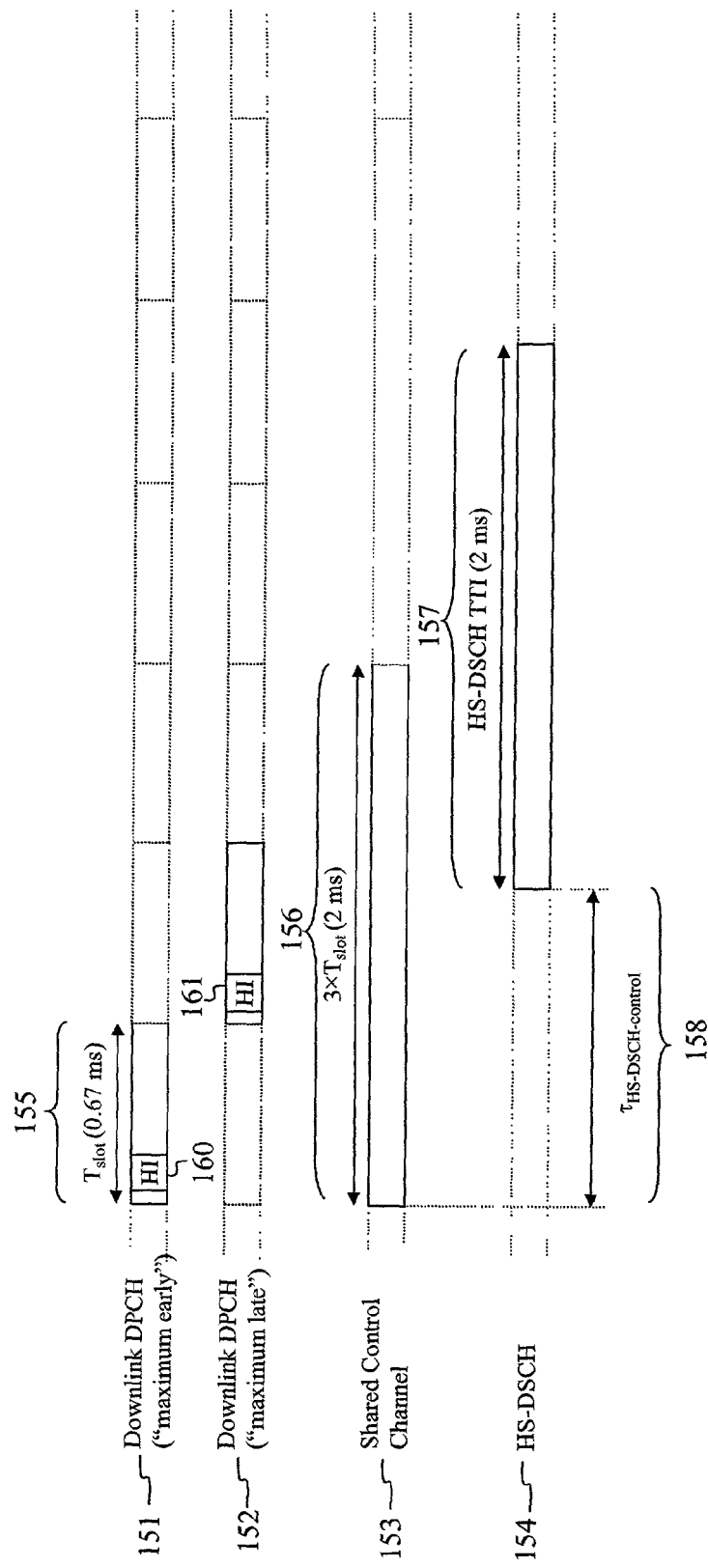
FIG. 2 shows a simplified diagram that illustrates the timing of the transmission of signaling information relative to the transmission of data in a high speed downlink shared channel in a wireless communication system.

FIG. 2 shows one exemplary transmission scenario 150 to illustrate the timing aspects of the transmission of signaling information with respect to the transmission of data over the High Speed Downlink Shared Channel (HS-DSCH) channel 154 according to the HSDPA standard. More specifically, FIG. 2 shows data transmission occurring in HS-DSCH 154 while corresponding signaling information is transmitted via Shared Control Channel (SCCH) 153 and one of either Downlink Physical Channels (DPCHs) 151 or 152. As is well known in HSDPA, the Transmission Time Interval (TTI) is two (2) milliseconds in duration as shown by TTI 156 in SCCH 153 and TTI 157 in HS-DSCH 154. Moreover, each TTI comprises three (3) time slots of equal duration, i.e., 0.67 milliseconds, as shown by time slot 155 in DPCH 151. The transmission of information in SCCH 153 and HS-DSCH 154 is synchronized while the information transmitted in DPCH 151 (or 152) is not synchronized. Time interval ($\tau_{HS\text{-}DSCH\text{-}control}$) 158 represents the offset between SCCH 153 and HS-DSCH 154, which is two (2) time slots in this example. Accordingly, there is a one (1) time slot overlap between SCCH 153 and HS-DSCH 154 in this particular example. The particular amount of overlap might vary depending on the acceptable amount of delay that can be tolerated for the particular system design.

Signaling information in SCCH 153 is used to provide information about the transmission format for the data transmission in HS-DSCH 154, e.g., which codes are being used, modulation being used, and so on. As such, the mobile station (user) must read the corresponding signaling information in SCCH 153 before the end of TTI 157.

Accordingly, the HS-DSCH Indicator (HI) must be transmitted in a user's dedicated DPCH 151 (or DPCH 152) early enough to enable the user to then read the signaling information in the appropriate SCCH 153. In the first example shown in FIG. 2, HI 160 in DPCH 151 occurs at the start of the first time slot 155. In the second example, HI 161 occurs after the end of time slot 155 (e.g., at the start of the second time slot). As such, HI 160 represents the earliest that the indicator can be sent ("maximum early") while HI 161 represents the latest that the indicator can be sent ("maximum late"). In this manner, a user would receive HI 160 (or 161) and then obtain the signaling information in SCCH 153 to support the corresponding data transmission during TTI 157.

According to the principles of the invention, only a subset of the signaling information from SCCH 153 is needed to start receiving the data transmission in channel 154 even though all of the information in SCCH 153 must be received by the end of TTI 157. In each TTI, a SCCH carries downlink signaling information for one mobile station.

Figure 3:
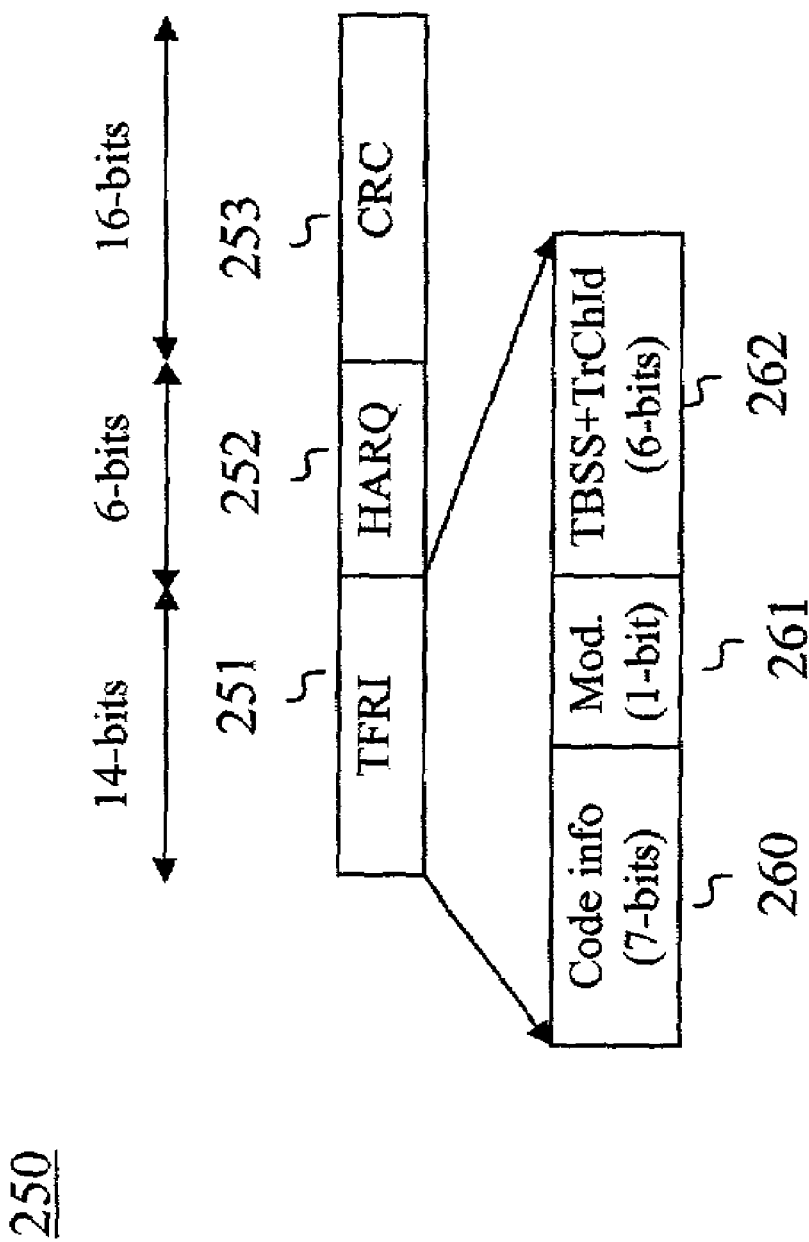
FIG. 3 shows a simplified block diagram of a communication channel format for a shared control channel in a wireless communication system according to one exemplary embodiment of the invention.

FIG. 3 shows, in simplified form, the contents of a typical SCCH 250. In particular, SCCH 250 includes Transport Format and Resource-Related Information (TFRI) 251, Hybrid Automatic Repeat Request (HARQ) information 252, and Cyclic Redundancy Check (CRC) information 253. More specifically, TFRI 251 is used to convey information about the dynamic part of the HS-DSCH transport format, including code information 260, e.g., the set of physical channels (channelization codes) in the corresponding HS-DSCH Transmission Time Interval (TTI), modulation information 261, and Transport Block Set Size (TBSS) and Transport Channel Identification information 262. The coding rate will be implicit from the information carried in blocks 260-262.

Hybrid ARQ (HARQ) information 252 includes, for example, the HARQ process identifier in the corresponding HS-DSCH Transmission Time Interval (TTI). HARQ information 252 may also include information about the redundancy of the transmission in the corresponding HS-DSCH TTI. The SCCH is also used to carry information that identifies the mobile station (e.g., user equipment) for which the SCCH carries signaling information related to the HS-DSCH. For this purpose, CRC information 253 is used to identify the particular mobile station.

In the particular example of a typical HSDPA transmission shown in FIG. 3, SCCH 250 includes 14-bit TFRI 251, 6-bit HARQ 252, and 16-bit CRC 253. However, it will be appreciated that the principles of the invention are not to be limited to this particular embodiment.

According to the principles of the invention, only a portion or subset of the control information in the SCCH is decoded before the start of data transmission on the HS-DSCH, e.g., partial decoding is performed. In one exemplary embodiment, only the TFRI or a subset of the TFRI is decoded before the start of data transmission on HS-DSCH, i.e., before the start of the HS-DSCH Transmission Time Interval (TTI). As such, the TFRI information is separately encoded from the HARQ and CRC information in this exemplary embodiment. In yet another example, a subset of the TFRI (e.g., code information 260) can be separately encoded from the remainder of the TFRI information and the HARQ and CRC information.

As described, control information in the SCCH can be encoded using either block codes or convolutional codes to provide the desired reliability. With block coding, the code information and the remaining information in the SCCH can be separately encoded and decoded. However, block codes provide poor performance with hard-decision decoding. Convolutional codes provide inherent soft-decision decoding and, as such, provide better performance. However, separately encoding the different information in the SCCH (e.g., code information 260 and the other remaining information) with convolutional codes can result in higher overhead due to the addition of tail bits for each of the convolutional codes. If only one convolutional code is used for all the information in the SCCH, then the error rate on the portion of SCCH information that is to be partially decoded before the HS-DSCH TTI may be higher than the total SCCH block error rate.

Continuing with the above example, the shared control channel is offset relative to the corresponding Transmission Time Interval (TTI) on the HS-DSCH by two (2) time slots. As such, the control information in the SCCH is transmitted two (2) slots before the start of the corresponding TTI on the HS-DSCH and there is a one (1) slot overlap between the SCCH and the HS-DSCH. Because of the offset, partial decoding can therefore be performed on some of the SCCH information before the start of the HS-DSCH TTI.

Figure 4:
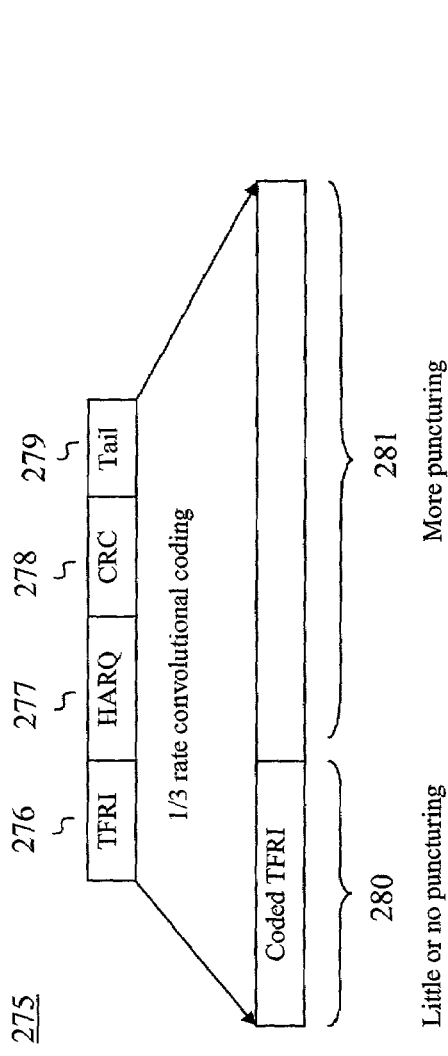
FIG. 4 shows a simplified block diagram of a communication channel format and associated coding for a shared control channel according to one exemplary embodiment of the invention.

According to an aspect of the invention, the additional overhead associated with convolutional coding, e.g., additional tail bits, can be effectively managed so that coding efficiencies of convolutional coding can be realized, e.g., better performance due to inherent soft-decision decoding. More specifically, convolutional codes with a single set of tail bits are used in one exemplary embodiment of the invention to separately encode the different types of information carried in the SCCH. In FIG. 4, for example, SCCH 275 includes TFRI 276, HARQ 277, CRC 278, and tail bits 279. As will be described in more detail below, a rate ⅓ convolutional code is used in this exemplary embodiment for encoding the control information transmitted in SCCH 275 although this example is meant to be illustrative only and not limiting in any manner. The rate ⅓ coded sequence may need to be "punctured" to match the data rate of the SCCH. In particular, puncturing is used to selectively remove certain bits from the coded sequence. One specific example of puncturing will be described with reference to FIG. 5 below.

Returning to FIG. 4, TFRI 276 is encoded separately, as shown by block 280 while the remainder of the information in SCCH 275 is encoded and transmitted as portion 281. In this manner, coded TFRI 280 can be decoded prior to the remaining coded portion 281 being received. It should be noted that coded TFRI 280 is not interleaved with the rest of the coded information 281. Those skilled in the art will appreciate that a subset of TFRI 276 (e.g., code information 260 in FIG. 3) may also be separately encoded instead of the entire TFRI 276. The particular contents of TFRI 276 that are to be separately coded will be determined by which signaling information is needed and which can be partially decoded prior to the start of the corresponding HS-DSCH TTI.

Since coded TFRI 280 is decoded prior to receiving the whole coded sequence of information from SCCH 275, it is possible that the error rate may be higher on TFRI 280 than on the rest of the information in SCCH 275. For example, TFRI 280 will be decoded without the benefit of tail bits 279 in this embodiment. In order to provide comparable reliability on TFRI 280 as with the other coded information in SCCH 275 (e.g., HARQ 277 and CRC 278), a variable or unequal puncturing scheme is used in conjunction with the convolutional coding scheme according to one exemplary embodiment. More specifically, little or no puncturing is performed on coded TFRI 280, which is the information that is decoded prior to the start of the HS-DSCH TTI, while more puncturing is performed on the remaining coded sequence of information 281 from SCCH 275. In this manner, rate matching can be achieved while avoiding higher error rates in the prior decoded information (e.g., coded TFRI 280) that would otherwise occur if more puncturing was performed on coded TFRI 280.

Figure 5:
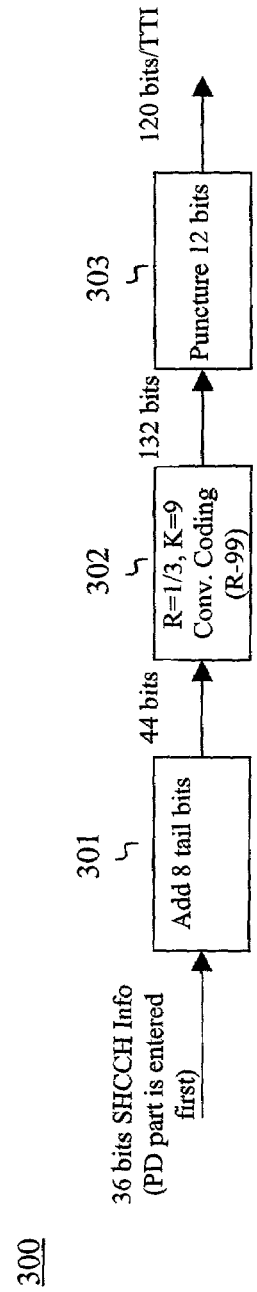
FIG. 5 shows a coding scheme according to one exemplary embodiment of the invention.

FIG. 5 illustrates an exemplary coding scheme 300 according to the preceding embodiments. More specifically, the process starts with the 36 bits of control information from the SCCH as described previously in FIG. 3 (e.g., 14-bit TFRI, 6-bit HARQ, and 16-bit CRC). In block 301, 8 tail bits are added to the sequence according to well known techniques resulting in an output sequence of 44 bits. Applying the aforementioned convolutional coding scheme in block 302 (e.g., R=1/3, K=9) according to well known techniques, the resulting coded sequence is now 132 bits as shown. With a spreading factor of 128 for HS-SCCH, 120 bits is the maximum number of bits that can be carried in a two (2) millisecond Transmission Time Interval (TTI), so the coded sequence exceeds the maximum by 12 bits. As such, 12 bits are punctured from the coded sequence as shown by block 303. Consistent with the preceding embodiment in which little or no puncturing is performed on the coded information that is to be decoded early, e.g., prior to the start of the HS-DSCH TTI and prior to the entire coded SCCH sequence being received, the 12 bits are punctured from the latter part of the coded sequence that is not used in prior decoding (e.g., within portion 281 of FIG. 4).

According to another aspect of the invention, the total number of tail bits can be distributed in multiple locations of the SCCH coded sequence. For example, a small sequence of tail bits (e.g., a subset of the total number of tail bits to be appended to the SCCH coded sequence) can be added at the end of the coded TFRI information (e.g., 280 in FIG. 4) to further reduce the probability of errors on the coded TFRI information 280.

Figure 6:
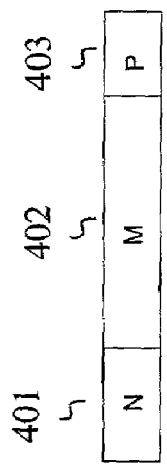
FIGS. 6 and 7 show simplified block diagrams of alternative convolutional coding schemes employing tail bits according to one exemplary embodiment of the invention.
Figure 7:
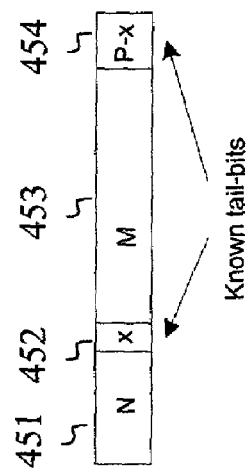

For example, FIG. 6 shows the generic case for a frame 400 (e.g., transmission time interval (TTI)) that contains two or more fields of information 401 and 402, wherein field 401 includes N bits and field 402 includes M bits that are to be convolutionally encoded. As is conventionally done with frame-based transmission, P tail bits 403 are appended to the whole sequence of N and M bits prior to convolutional encoding. Generally, P=K−1, where K is the constraint length of the convolutional code and is a sequence of all zeros. By including the tail bits according to this scheme, convolutional decoder is brought to the all-zero state thereby allowing the selection of the maximum likelihood sequence that terminates in that state.

In conventional decoding of convolutional codes (with tail bits 403 as shown), the entire sequence of information bits N and M in frame 400 is determined only after all the coded bits have been received. As described in the preceding embodiments, it is desirable to decode a first portion of the frame (e.g., the N bits corresponding to the first field 401 in FIG. 6 and TFRI 276 in FIG. 4) prior to receiving the entire sequence of coded bits. When N is small, selecting the maximum likelihood sequence at the Nth stage of decoding in a convolutional code would generally result in very poor performance, as those N bits do not get the benefit of being jointly encoded with the other M+P bits.

One way to improve the decoded error probability of the N bits with early decoding (e.g., early decoding of TFRI 276/280 in FIG. 4) is shown in FIG. 5. More specifically, tail bits 403 from FIG. 6 are split by inserting a subset x (452) of the P tail bits immediately after the N bit field 451. The remaining P−x tail bits 454 are then appended after the M bit field 453. With this approach, a tradeoff can be achieved in the decoded error probability of the N-bit field 451 based on early decoding and the overall decoded error probability of frame 450. Although a large value for x (452) would improve the decoded error probability of N bit field 451, the overall decoded error probability (and consequently of M bit field 453) would be degraded. The choice of an appropriate value for x tail bits 452 is therefore a matter of design choice and would depend on such factors as the acceptable decoded error probability for the two fields 451 and 453.

According to another aspect of the invention, errors on the early decoded information (e.g., decoding a portion of the overall coded sequence before receiving the entire sequence) can also be detected when all the SCCH information is decoded. For example, errors in decoding the TFRI may result in the inaccurate identification of which codes (transmission format) are being used for the data transmission. In one example, early decoding of the TFRI might have revealed that codes 4 through 10 are being used for the data transmission. However, at the end of the decoding of the entire SCCH coded sequence, the more accurate decoding with the benefit of the CRC might reveal that only codes 6 through 8 are actually being used for the data transmission. To this point, codes 4-5 and 9-10 were unnecessarily buffered and so on. However, the more accurate decoding with the benefit of the CRC can now be used to at least halt processing of transmission in the inapplicable codes. Because of the offset between the SCCH and HS-DSCH, there is still some benefit to utilizing this updated and more accurate decoded signaling information. Accordingly, some errors resulting from the early decoding of the TFRI can be corrected after the CRC passes.

In general, the foregoing embodiments are merely illustrative of the principles of the invention. Those skilled in the art will be able to devise numerous arrangements, which, although not explicitly shown or described herein, nevertheless embody those principles that are within the scope of the invention. For example, although the invention was described in the context of wireless transmission according to the High Speed Downlink Packet Access (HSDPA) specification in the Universal Mobile Telecommunication System (UMTS) standard, the invention could also be applicable to other known or to-be-developed wireless transmission standards. Other modifications or substitutions will be apparent to those skilled in the art and are contemplated by the teachings herein. Accordingly, the embodiments shown and described herein are only meant to be illustrative and not limiting in any manner. The scope of the invention is limited only by the claims appended hereto.

We claim:

1. A method for processing control information in a wireless communication system via a shared control channel that includes encoded signaling information for a corresponding data transmission in another channel, the method comprising:

in the shared control channel, separately decoding a portion of the encoded signaling information; and deriving transmission format information from the separately decoded portion of the encoded signaling information for the corresponding data transmission before a remainder of the encoded signaling information is decoded.

2. The method according to claim 1, wherein each of a plurality of mobile stations has a corresponding dedicated control channel, the method further comprising the step of:

at one of the plurality of mobile stations, receiving information in the dedicated control channel corresponding to that mobile station and indicating to that mobile station that the encoded signaling information in the control channel corresponding to that mobile station is associated with a data transmission for that mobile station.

3. The method according to claim 1, wherein the encoded signaling information includes information selected from one or more of the groups consisting of transport format and resource-related information, hybrid automatic repeat request information, and cyclic redundancy check information.

4. The method according to claim 3, wherein the transport format and resource-related information includes the transmission format information.

5. The method according to claim 4, wherein the transmission format information includes information selected from one or more of the groups consisting of code information, modulation information, transport block set size information, and transport channel identification information.

6. The method according to claim 1, wherein the step of separately decoding a portion of the encoded signaling information is performed prior to the start of a transmission time interval corresponding to the data transmission.

7. The method according to claim 1, wherein the encoded signaling information is convolutionally coded and wherein a single set of tail bits are added to the encoded signaling information.

8. The method according to claim 1, wherein the encoded signaling information is convolutionally coded and wherein tail bits are selectively added to the encoded signaling information so that the portion of the encoded signal information that is separately decoded includes a subset of the total number of tail bits.

9. The method according to claim 8, further comprising the step of puncturing selected bits from the encoded signaling information.

10. The method according to claim 9, wherein the puncturing of bits from the portion of the encoded signaling information that is separately decoded is less than the puncturing of bits from the remaining encoded signaling information.

11. A method for processing information in a wireless communication system via a shared communications channel that includes encoded signaling information, wherein the encoded signaling information includes one or more portions of encoded information, the method comprising:

selectively puncturing bits from the encoded signaling information such that the number of bits punctured from certain of the one or more portions is less than the number of bits punctured from other portions;

separately decoding at least one portion of the coded information to derive the transmission format information before a remainder of the coded information is decoded; and separately decoding the certain one or more portions of the encoded information to facilitate transmission in the wireless communication system.

12. A method for transmitting control information in a wireless communication system via a shared control channel that includes signaling information for a corresponding data transmission in another channel, the method comprising:

encoding the signaling information such that portions of the signaling information are separately encoded and one or more of the portions include transmission format information for the corresponding data transmission; and transmitting the encoded signaling information via the control channel such that the transmission format information can be derived from the one or more portions before a remainder of the encoded portions are decoded.

13. A method for decoding control information in a wireless communication system via a shared control channel including at least one base station and at least one mobile station, the method comprising:

receiving coded information at a mobile station, wherein the coded information includes signaling information indicative of a transmission format that corresponds to a data transmission;

separately decoding a portion of the coded information to derive the transmission format information before a remainder of the coded information is decoded.

* * * * *

UNITED STATES PATENT AND TRADEMARK OFFICE
CERTIFICATE OF CORRECTION

PATENT NO. : 7,573,942 B2 Page 1 of 1
APPLICATION NO. : 09/991111
DATED : August 11, 2009
INVENTOR(S) : Das et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2096 days.

Signed and Sealed this

Seventh Day of September, 2010

David J. Kappos
*Director of the United States Patent and Trademark Office*